US008397044B2

(12) United States Patent
Obata et al.

(10) Patent No.: US 8,397,044 B2
(45) Date of Patent: *Mar. 12, 2013

(54) MEMORY MANAGEMENT METHOD AND COMPUTER USING THE METHOD

(75) Inventors: Motoki Obata, Yokohama (JP); Hiroyasu Nishiyama, Kawasaki (JP); Kei Nakajima, Chigasaki (JP); Koichi Okada, Yokohama (JP); Takuma Nagase, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/105,636

(22) Filed: May 11, 2011

(65) Prior Publication Data

US 2011/0213943 A1    Sep. 1, 2011

Related U.S. Application Data

(63) Continuation of application No. 12/038,376, filed on Feb. 27, 2008, now Pat. No. 7,979,659.

(30) Foreign Application Priority Data

Aug. 3, 2007    (JP) ................................. 2007-203288

(51) Int. Cl.
*G06F 12/00*    (2006.01)
*G06F 13/00*    (2006.01)
(52) U.S. Cl. ......... 711/165; 711/100; 711/154; 711/170
(58) Field of Classification Search .................. 711/100, 711/154, 165, 170
See application file for complete search history.

(56) References Cited

U.S. PATENT DOCUMENTS

| | | | | |
|---|---|---|---|---|
| 6,128,623 | A | * | 10/2000 | Mattis et al. .................. 711/118 |
| 6,728,738 | B2 | * | 4/2004 | Wolczko et al. ...................... 1/1 |
| 7,484,067 | B1 | | 1/2009 | Bollella et al. |
| 7,496,897 | B1 | | 2/2009 | Dibble et al. |
| 7,644,308 | B2 | * | 1/2010 | Voigt et al. ...................... 714/20 |
| 7,873,965 | B2 | * | 1/2011 | Hayton et al. ................ 719/315 |
| 2003/0097537 | A1 | | 5/2003 | Bollella et al. |
| 2003/0140071 | A1 | | 7/2003 | Kawamoto |
| 2007/0288538 | A1 | | 12/2007 | Bacon et al. |

FOREIGN PATENT DOCUMENTS

| | | |
|---|---|---|
| JP | 63-093055 A | 4/1988 |
| JP | 2001-184254 A | 7/2001 |
| JP | 2003-186737 A | 7/2003 |

(Continued)

OTHER PUBLICATIONS

"Real-Time Java Scoped Memory: Design Patterns and Semantics" F. Pizlo, et al. 2004, ISORC' 04.

(Continued)

*Primary Examiner* — Tuan V. Thai
(74) *Attorney, Agent, or Firm* — Mattingly & Malur, PC

(57) ABSTRACT

Memory management by garbage collection involves a memory area that is allocated in a computer. Data is created in the memory area in accordance with a program executed by a processor of the computer, and it is checked whether or not data necessary to execute the program exists in the memory area to be released, in response to an explicit instruction to release the memory area. As a result of the check, if data necessary to execute the program does not exist in the memory area, the memory area is released. As a result of the check, if data necessary to execute the program exists in the memory area, the data is moved to a memory area different from the memory area to be released.

21 Claims, 11 Drawing Sheets

FOREIGN PATENT DOCUMENTS

| | | | |
|---|---|---|---|
| JP | 2003-241967 A | 8/2003 | |
| JP | 2007-86838 A | 4/2007 | |

OTHER PUBLICATIONS

Efficient Memory-Reference Checks for Real-time Java, Corsaro et al., LCTES' Jun. 3, 2003.

Inside the Java Virtual Machine: Chapter 9, Garbage Collection; Venners, Bill; artima.com; published online Dec. 1, 2002 and last updated Nov. 15, 2002.

Chiba, Yuji, "High-performance Write Barriers for Thread-local Garbage Collection", May 2004, 10 pages, Domestic Academic theses 2005-00474-005, vol. 45, No. SIG5 (Pro 21), Japan.

* cited by examiner

FIG. 3

```
1:  // CREATE EXTERNAL HEAP
2:  ExplicitMemory em = new ExplicitMemory () ;           ─201

3:  // MOVE EXISTING OBJECT TO EXTERNAL HEAP
4:  em. moveObject (obj) ;                                ─301

5:  // CREATE DATA DIRECTLY IN EXTERNAL HEAP
6:  String s = (String) em. newInstance (String. class)   ─302

7:  {any operation ;}

8:  // RELEASE EXTERNAL MEMORY AREA
9:  ExplicitMemory. reclaim (em) ;                        ─203
```

```
1:  // CREATE EXTERNAL HEAP
2:  ExplicitMemory em = new ExplicitMemory () ;          — 201

3:  // OBJECT CREATED IN ENTER TO EXIT IS
    // CREATED OR MOVED INTO EXTERNAL HEAP
4:  em. enter () ;
5:    {any operation ;}                                  — 202
6:  em. exit () ;

7:  // OBJECT TO BE MOVED TO EXTERNAL HEAP
    // IS ACTUALLY MOVED TO EXTERNAL HEAP
8:  ExplicitMemory. commitChanges (em) ;                 — 204

9:  {any operation ;}

10: // WITHDRAW UNNECESSARY OBJECT FROM
    // EXTERNAL HEAP
11: em. compact () ;                                     — 401

12: {any operation ;}

13: // RELEASE EXTERNAL MEMORY AREA
14: ExplicitMemory. reclaim (em) ;                       — 203
```

INITIAL STATE

RELEASE EXTERNAL HEAP 111 (INVALID PATTERN)

INITIAL STATE

STEP 703 (FIRST TIME)

STEP 703 (SECOND TIME)

FIG. 9

```
1:  // CREATE EXTERNAL HEAP
2:  ExplicitMemory em = new ExplicitMemory ();           ~201

3:  em. setReclamationAction (EXCEPTION);                ~901

4:  // OBJECT CREATED IN ENTER TO EXIT IS
    // CREATED OR MOVED INTO EXTERNAL HEAP
5:  em. enter ();
6:    {any operation ;}
7:  em. exit ();

8:    {any operation ;}

9:  // RELEASE EXTERNAL MEMORY AREA
10: ExplicitMemory. reclaim (em);                        ~203
```

104

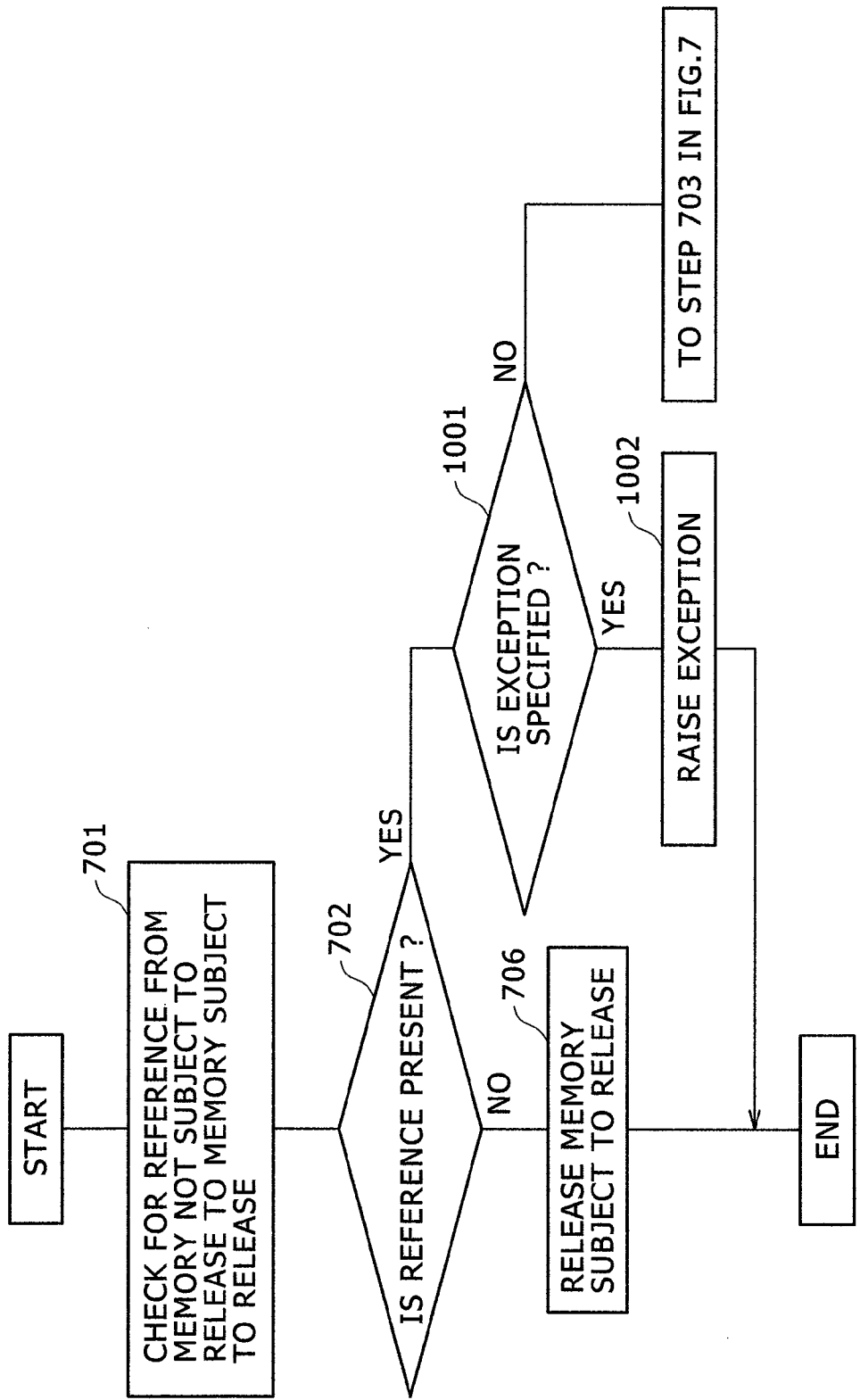

INITIAL STATE
(INVALID PATTERN)

DELETE SCOPED MEMORY
1101 (INVALID PATTERN)

MEMORY MANAGEMENT METHOD AND COMPUTER USING THE METHOD

This is a continuation application of U.S. application Ser. No. 12/038,376, filed Feb. 27, 2008, now allowed, the contents of which are hereby incorporated by reference into this application.

The present application claims priority from Japanese patent application No. 2007-203288 filed on Aug. 3, 2007.

BACKGROUND OF THE INVENTION

The present invention relates to a memory management method in a computer and the computer therefor.

DESCRIPTION OF THE RELATED ART

It is known that processing for allocating and releasing memory areas which are used by a computer program under development is one of the items which cause inconvenience to a program developer and easily cause program bugs. For example, in the C/C++ language which is a common program language, a user needs to explicitly describe the allocation and release processing of a memory area necessary to execute a program, which often causes program bugs. Examples of program failures include a memory leak (a phenomenon in which available memory areas are gradually decreased against a programmer's intention) caused by forgetting to withdraw (delete) data from an allocated memory area and an invalid reference to a released memory area. While a programmer has to always pay attention to memory availability to develop a program, it is becoming difficult to completely grasp the allocation and release processing of all memories due to program development by plural programmers and bloated program code.

A garbage collector which performs automatic memory management in a program is used as a means for solving this problem. In Java (a trademark of Sun Microsystems, Inc. in the United States) which is a language processor that performs memory management using the garbage collector, there is provided an API (Application Program Interface) for allocating a memory during program execution, but there is no API for releasing the memory. That is, a Java program (hereinafter may be referred to simply as the program) developer needs to specify the allocation of a memory area, but does not need to specify the release processing of the allocated memory area. The garbage collector implemented in a Java virtual machine for executing the program releases a memory area allocated in the process of execution of the program. The function performed by the garbage collector is called garbage collection (GC). That is, GC is the function of withdrawing unnecessary data from the memory area dynamically allocated by the program and automatically releasing the area.

In GC, depending on the implementation method, all Java program execution threads are basically halted to withdraw unnecessary data. The Java virtual machine activates GC (performs the garbage collector having the GC function) when the amount of used Java heap memory for storing data (object) created in the program exceeds a threshold. It is difficult for a user to estimate the amount of memory used by executing the program and to foresee threshold crossing timing. Thus, since it is also difficult for the user to foresee the activation of GC by threshold crossing, the program is halted at random times due to the activation of GC. Further, in generational garbage collection often adopted as a method for implementing GC in the Java virtual machine, there occur GC that completes in a short time and GC that requires a long halt; however, it is difficult to foresee which GC will occur next. If the occurrence of GC that requires a long halt can be foreseen, it is possible to avoid an unexpected long halt by explicitly activating GC at the time of a small load on the Java runtime environment (Java virtual machine); however, it is unknown to the user when and how long GC occurs as described above.

In recent years, the Java system (a system which executes on the Java virtual machine the program described in the Java language) has been used in servers and embedded devices such as mobile phones and car navigation systems. However, in these devices, occurrence of a program halt due to unexpected activation of GC disadvantageously causes no response of the entire system, and methods for solving this problem have been developed (see Angelo Corsaro and Ron K. Cytron, Efficient Memory-Reference Checks for Real-time Java, Proceedings of the 2003 Conference on Languages, Compilers, and Tools for Embedded Systems, 2003 and F. Pizlo, J. M. Fox, D. Holmes and J. Vitek, Real-Time Java Scoped Memory: Design Patterns and Semantics, Proceedings of the Seventh IEEE International Symposium on Object-Oriented Real-Time Distributed Computing, 2004).

In order to avoid a program halt by GC, for example in the Real Time Specification for Java (RTSJ) specializing in real-time processing, it is possible to set an external memory area not subject to GC called a scoped memory. By creating data in a series of program processes into the scoped memory explicitly allocated by the program instead of a Java heap memory subject to GC, the occurrence of GC due to exhaustion of the Java heap memory can be reduced. When the data in the scoped memory becomes unnecessary after the completion of the series of program processes, the whole scoped memory including the data is deleted instead of withdrawing the unnecessary data by GC. That is, instead of deleting the data to provide an available area, the area is deleted, and newly allocated when it needs to be used. Hereinafter, the deletion of a memory area is referred to as "release".

No matter what memory management method is used, data necessary to execute the program has to remain in a memory. In the memory management method using the garbage collector, all data that can be referred to from an area called a root set such as a register and a run-time stack is treated as data necessary for execution, thus distinguishing data necessary for subsequent execution of the program from unnecessary data.

In the case of using a method of avoiding GC by setting a memory area not subject to GC such as RTSJ, there are constraints on the programming API to prevent an invalid result of program execution, and there occurs overhead to check for violation of the constraints during the execution. In this context, the "constraints" denote a constraint of retention of the scoped memory and a limitation of the reference between data. The scoped memory in RTSJ is a memory area that can exist only while at least one thread created by the Java program is executing a scope specified by an "enter" method and an "executeInArea" method, that is, a section from a predetermined step to another predetermined step in the program, and is automatically released when all threads exit this scope. Therefore, to retain the scoped memory, at least one thread has to execute this scope, and the scoped memory is treated as a temporary data area.

In the release processing of the scoped memory, the scoped memory is released without processing data in the scoped memory. To achieve this, there is a limitation on the reference relationship of data created in the scoped memory (see Angelo Corsaro and Ron K. Cytron, Efficient Memory-Reference Checks for Real-time Java, Proceedings of the 2003

Conference on Languages, Compilers, and Tools for Embedded Systems, 2003 and F. Pizlo, J. M. Fox, D. Holmes and J. Vitek, Real-Time Java Scoped Memory: Design Patterns and Semantics, Proceedings of the Seventh IEEE Internal Symposium on Object-Oriented Real-Time Distributed Computing, 2004).

Description will be made taking an example of a memory area and data placement shown in FIG. 11A. In FIG. 11A, there are data 1102-1 and data 1102-2 in a Java heap memory 110 subject to GC and data 1103-1 and data 1103-2 in a scoped memory 1101 not subject to GC. The data 1102-1 and the data 1103-2 refer to the data 1103-1, and the data 1103-2 refers to the data 1102-2. This is an invalid memory state in RTSJ. In FIG. 11A, the reference from the data 1102-1 to the data 1103-1 is indicated by an arrow 1104, the reference from the data 1103-2 to the data 1103-1 is indicated by an arrow 1105-1, and the reference from the data 1103-2 to the data 1102-2 is indicated by an arrow 1105-2. The memory area and data state after the release of the scoped memory 1101 including the data 1103-1 and 1103-2 is shown in FIG. 11B.

As shown in FIG. 11B, the data 1102-1 refers to the invalid memory area which has been released, so that in this state the program does not run properly. In RTSJ, a stack-wise concept called a scope stack is introduced to prevent this state. In the scope stack, there is a limitation that data created in a deep scope cannot refer to data created in a shallow scope so that a reference such as the reference 1104 in FIG. 11A cannot be created right from the start. Therefore, the state of FIG. 11A is invalid. By following this limitation, it can be ensured that releasing a scoped memory at the time of no thread executing the scope for creating data in a scoped memory does not affect the execution of the program.

For example, in FIG. 11A, when the execution of a scope for creating data (1102-1 and 1102-2) in the Java heap memory is started, this information is stored in the scope stack. After that, a scoped memory is created, and when at least one thread starts to execute a scope specified by the "enter" method and the "executeInArea" method for the scoped memory, information on the scope is added to the scope stack. At this time, in the scope stack, the information of "a scope for creating data in the Java heap memory" is stored in a deep stack, and the information of "a scope for creating data in the scoped memory" is stored in a shallow stack.

In light of the limitation on the reference relationship between data in RTSJ, the reference 1104 from the data 1102-1 to the data 1103-1 in FIG. 11A is the reference from the data created in the deep scope in the scope stack to the data created in the shallow scope, and therefore cannot be created. On the other hand, the reference 1105-1 from the data 1103-2 to the data 1103-1 in FIG. 11A is the reference from the data created in the shallow scope in the scope stack to the data created also in the shallow scope, and therefore can be created. Further, the reference 1105-2 to the data 1102-2 is the reference to the data created in the deep scope and therefore can be created. When all threads exit the scope for creating data in the scoped memory, data in the scoped memory cannot be referred to; therefore, the release of the memory area does not affect the execution of the program.

SUMMARY OF THE INVENTION

In the Java system or the like which performs memory management by garbage collection, in the case where there can be used a memory area that is not subject to garbage collection and can be explicitly allocated by the program, the constraints of the retention of the memory area and the reference relationship between data during use greatly decreases the convenience of the memory area. That is, as a condition for the retention of the memory explicitly allocated by the program, at least one thread needs to execute a section for creating data in the memory area, whereas this condition imposes a significant constraint on programming. Further, due to the constraint of the reference relationship between data, a user has to always pay attention to the reference relationship between data to develop programs; however, it is extremely difficult to completely grasp the reference relationship in the memory area due to bloated program size and the creation of implicit data not described in the user program. An occurrence of a reference relationship violating the constraint by a run-time check raises exception handling, which may cause abnormal execution of the program.

Further, there is also a problem of occurrence of a significant degradation in program execution performance in the case of no use of such a memory area due to a run-time check according to the above constraints.

Before the description of the present invention and embodiments thereof, the "release" of a memory area (also referred to simply as a memory or an area) will be defined. The release of a memory area signifies that an area having a specified capacity and allocated in a specified location in the memory or data in the area is made unrecognizable from the program. Therefore, access to the released memory area from the program is invalid. If, after the release of the memory area, a new memory area is needed, a memory area is newly created (allocated). In comparison with the release of the memory area, data stored in an area having a specified capacity and allocated in a specified location in the memory may be withdrawn so that the area can be used for storage of new data. The function of withdrawing data is the garbage collection.

One aspect of the invention is a memory management method including the steps of allocating a memory area by a program which is executed by a processor in a computer, storing data in the allocated memory area in accordance with execution of the program, checking whether or not data necessary for subsequent execution of the program exists in the memory area to be released, in response to an instruction by the program to release the allocated memory area, and releasing the memory area if data (object) necessary for subsequent execution of the program does not exist in the memory area as a result of the check.

Another aspect of the invention is a computer including a memory and a processor, which is configured as follows. The memory includes a first area which is managed by garbage collection and a second area which, in accordance with execution of a program, is allocated, stores data, and is released. The processor moves data necessary for subsequent execution of the program to the first area if the data necessary for subsequent execution of the program exists in the second area, in response to an instruction to release the second area in association with execution of the program.

According the invention, the memory area allocated by the program can be released without imposing constraints on the execution of the program.

BRIEF DESCRIPTION OF THE DRAWINGS

FIG. 3 is an illustration showing an example in which data is created or moved into an external heap memory;

FIG. 4 is an illustration showing an example in which unnecessary data in an external heap memory is withdrawn;

FIG. 9 is an illustration showing an example in which an exception is raised if necessary data remains in an external heap memory to be released;

FIG. 10 is a flowchart showing release processing in which an operation in the case where necessary data remains in an external heap memory to be released is specified.

DESCRIPTION OF THE PREFERRED EMBODIMENTS

According to a preferred embodiment of the present invention, a memory area is allocated by a program which is executed by a processor, and data is stored (an object is created) in the allocated memory area in accordance with execution of the program. It is checked whether or not data necessary for subsequent execution of the program exists in the memory area to be released, in response to an instruction by the program to release the allocated memory area. As a result of the check, if data (object) necessary for subsequent execution of the program does not exist in the memory area, the memory area is released.

As a result of the check, if data necessary for subsequent execution of the program exists in the memory area, the data is moved to a memory area different from the memory area to be released. Necessary data for execution of the program is moved to a memory area different from the memory area to be released, and the different memory area is subject to garbage collection.

Another embodiment of the invention is a computer including a memory and a processor, which is configured as follows. The memory includes a first area which is managed by garbage collection and a second area which, in accordance with execution of a program, is allocated, data is stored in, and is released. The processor moves data necessary for subsequent execution of the program to the first area if the data necessary for subsequent execution of the program exists in the second area in response to an instruction to release the second area in association with execution of the program. This can achieve a computer that does not cause degradation in program execution performance.

First Embodiment

A memory management method according to an embodiment of the invention will be described with reference to the accompanying drawings. Although this embodiment will be described on the basis of a Java system (a system in which a program described in the Java language is executed on a Java virtual machine (also referred to as a Java runtime environment)), the embodiment is also effective for other systems having the garbage collection function.

Figure 1:
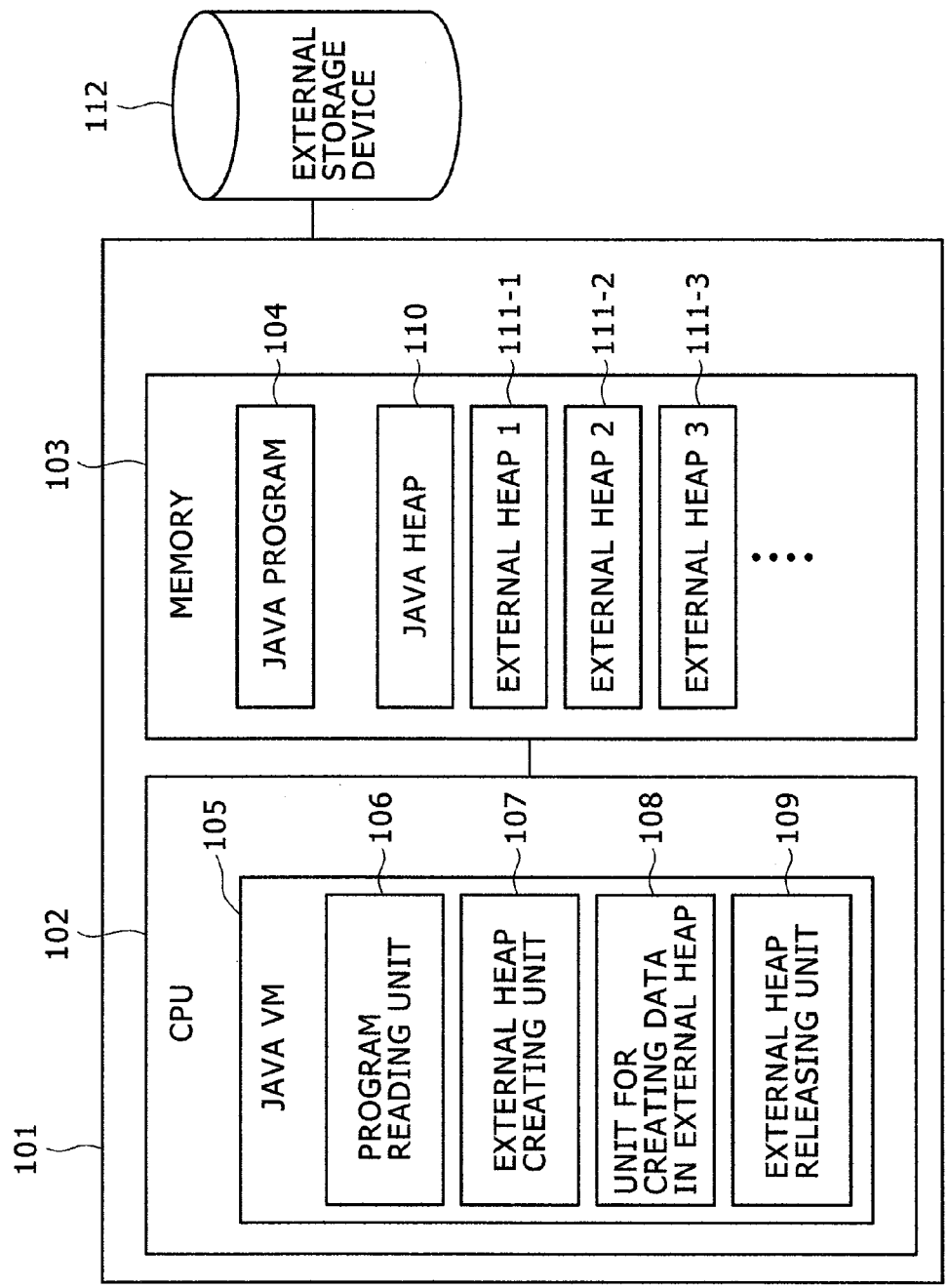
FIG. 1 is a diagram showing the configuration of a computer according to an embodiment of the present invention.

FIG. 1 is a diagram showing the configuration of a computer 101 according to this embodiment. The computer 101 includes a processor (CPU) 102 for performing various kinds of processing and a memory 103 containing a Java program 104 which is executed by a Java virtual machine (Java VM) 105 in the processor 102, a Java heap memory 110 which is used by the Java virtual machine 105, and external heap memories 111-1 to 111-3. An external heap memory 111 is created in accordance with the execution of an external heap memory creation sentence described in the Java program 104. The Java program 104 may be stored in an external storage device 112 in place of the memory 103.

In the Java program 104, there are descriptions of creating an external heap memory, storing data (creating an object) into the external heap memory, and releasing the external heap memory, in addition to required processing. When the Java virtual machine 105 performs the foregoing, the external heap memory 111 is created, used, and released. On the other hand, the Java heap memory 110 undergoes memory management such as garbage collection from the Java virtual machine 105, but not from the Java program 104.

To execute the Java program 104, the Java virtual machine 105 reads the Java program 104 by a program reading unit 106. When the Java virtual machine 105 executes a sentence for creating the external heap memory 111, an external heap creating unit 107 creates the external heap memory 111. In a section (from a predetermined step to another predetermined step) for creating data in the external heap memory 111 described in the Java program 104, a unit for creating data in the external heap memory 111 creates data in the external heap memory 111. Further, when the release of the external heap memory 111 is explicitly specified by the Java program 104, an external heap releasing unit 109 moves, to a memory area not subject to release, data present in the external heap memory 111 among data necessary for execution, and then releases the external heap memory 111.

Figure 2:
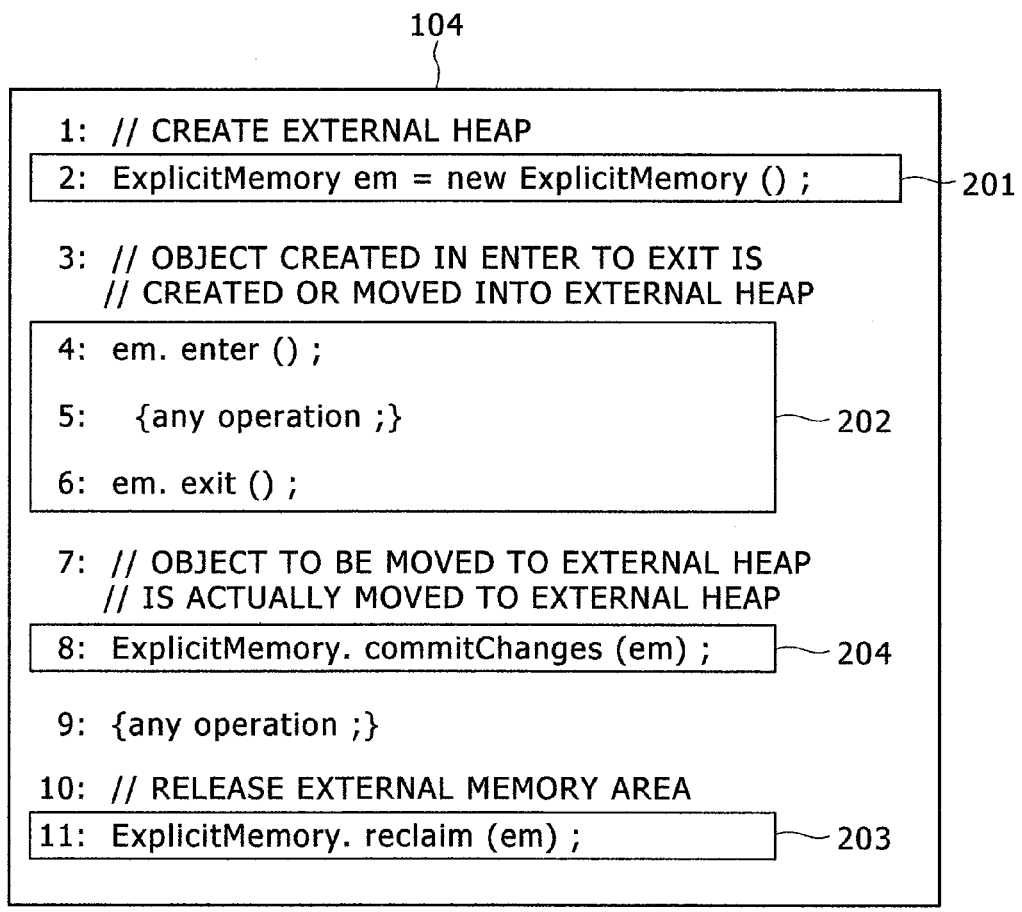
FIG. 2 is an illustration showing an example of a program for creating, using (creating data), and releasing an external heap memory.

FIG. 2 shows an example of the Java program 104 containing descriptions for creating the external heap memory 111, creating data in the external heap memory 111, and releasing the external heap memory 111. Line numbers are shown in the left of lines in FIG. 2, but not described in the actual program. Sentence 201 in line 2 is a description of creating (allocating) the external heap memory 111. Data created in process 202 made up of an "enter" method in line 4 to an "exit" method in line 6 is directly created (stored) in the external heap memory 111, or can be first created in the Java heap memory 110 and be explicitly moved to the external heap memory 111 by a "commitChanges" method in sentence 204 in line 8. In process 202 of the section from line 4 to line 6, directly creating data in the external heap memory 111 causes all data to be created in the external heap memory 111, including data that becomes unnecessary in a short time, which decreases the use efficiency of the memory area in the external heap memory 111. On the other hand, creating data in the Java heap memory 110 and then moving necessary data to the external heap memory 111 prevents the use efficiency of the memory area from being decreased.

In the "commitChanges" method of specifying data movement to the external heap memory 111, it is possible to specify not only an instance of a memory to which data is moved but also data to be moved, as an argument. In the example of FIG. 2, since only an external heap memory em to which data is moved is specified, all data that is to be moved is moved to the heap memory em. Further, data created in the sections other than process 202 is created in the Java heap memory 110. When the data created in the external heap memory 111 becomes unnecessary after it is used in arbitrary processing as shown in line 9 in FIG. 2, there is provided an instruction to release the external heap memory em as shown in sentence 203 in line 11 in FIG. 2. Further, there is no constraint on the programming or check on a reference relationship during execution in use of the external heap memory em in the arbitrary processing of line 9 in FIG. 2.

Figure 5:
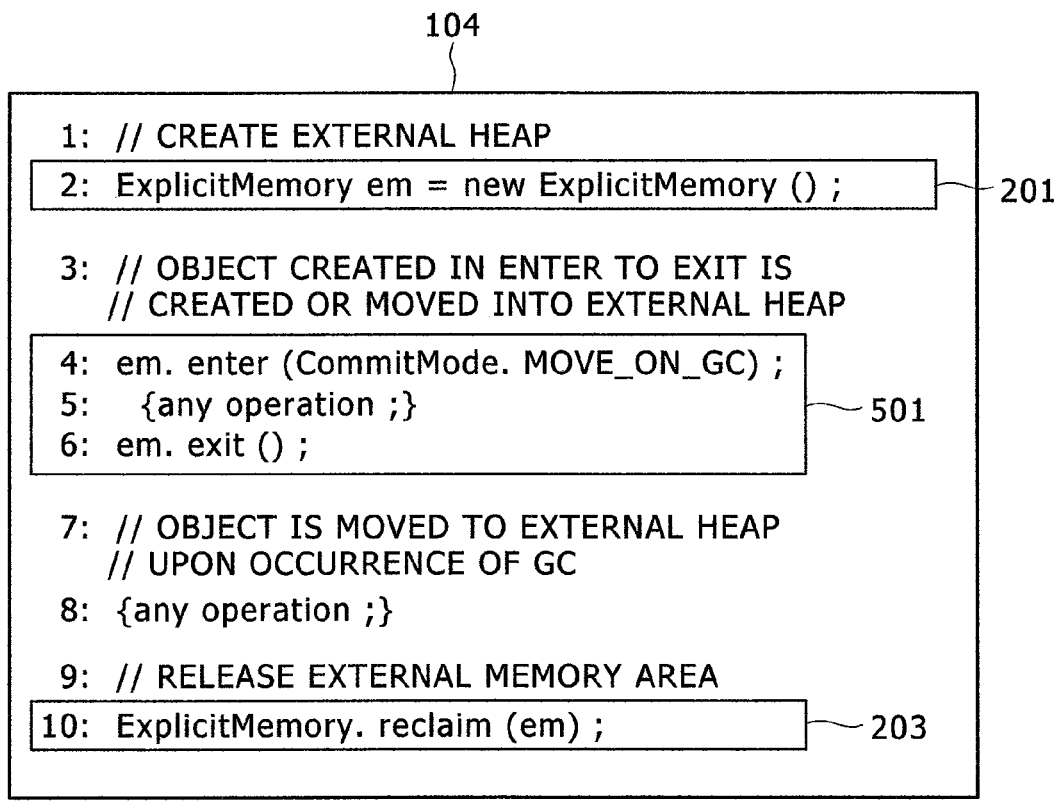
FIG. 5 is an illustration showing an example in which a moment for moving data into an external heap memory is specified.

FIGS. 3 to 5 show other program examples. In FIG. 3, instead of the "enter/exit" method of creating data in the external heap memory 111, a "moveObject" method of moving existing data (object) to the external heap memory em as shown in sentence 301 in line 4 and a "newInstance" method of specifying the class of data to be created and creating data directly in the external heap memory em as shown in sentence 302 in line 6 are used to utilize the external heap memory em.

Further, as shown in sentence 401 in FIG. 4, by executing a "compact" method of specifying the withdrawal of unnecessary data (object) from the external heap memory em, it is possible to increase free space in the external heap memory em.

In the case where more data is moved to the external heap memory em in arbitrary processing shown in line 12 in FIG. 4, the amount of movable data can be increased by executing in advance the "compact" method shown in sentence 401 in line 11.

FIG. 5 is an example in which data created in step 501 is moved to the external heap memory em upon occurrence of GC in the Java heap memory 110 by specifying "CommitMode.MOVE_ON_GC" as an argument of the "enter" method instead of specifying data movement by the "commitChanges" method. Since data that is determined by GC in the Java heap memory 110 to be necessary for subsequent execution of the program and is created in step 501 is moved to the external heap memory em, unnecessary data is hardly moved and the external memory area em can be used effectively.

Figure 6A:
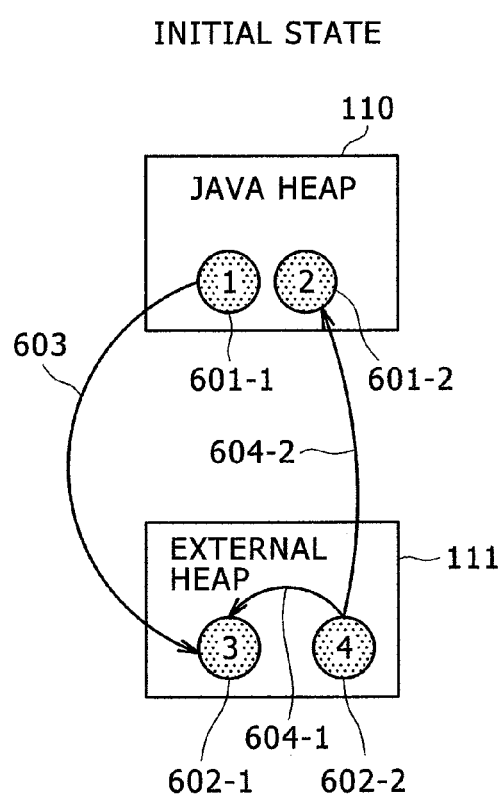
FIGS. 6A and 6B are illustrations showing an example invalid pattern in which an external heap memory is released.
Figure 6B:
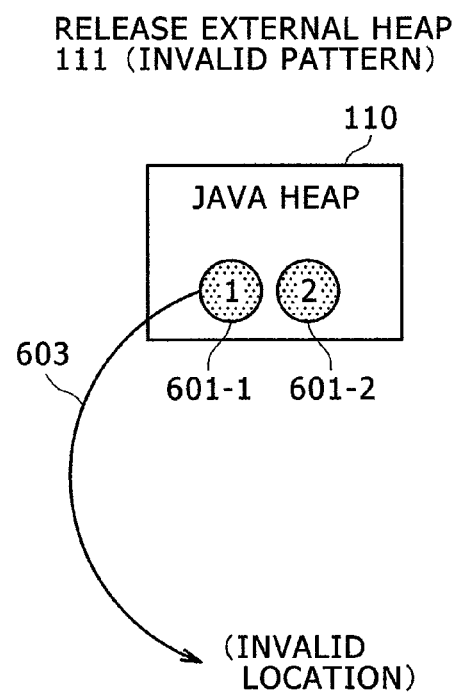

The release processing of the external heap memory 111 is performed by the external heap releasing unit 109 in FIG. 1. At this time, consideration must be given to the case where data present in the external heap memory 111 is necessary to execute the Java program 104. Data placement in the memory 103 shown in FIG. 6A is taken as an example. In FIG. 6A, there are data 601-1 and data 601-2 in the Java heap memory 110 and data 602-1 and data 602-2 in the external heap memory 111. The data 601-1 and the data 602-2 refer to the data 602-1, and the data 602-2 refers to the data 601-2. In FIG. 6A, the reference from the data 601-1 to the data 602-1 is indicated by an arrow 603, the reference from the data 602-2 to the data 602-1 is indicated by an arrow 604-1, and the reference from the data 602-2 to the data 601-2 is indicated by an arrow 604-2. When the external heap memory 111 is released in this state, the data 602-1 and the data 602-2 in the memory are deleted. Even though the references 604-1 and 604-2 from the data 602-2 become nonexistent, there arises no problem in executing the Java program 104. However, as for the reference 603, the data 601-1 refers to the data in the invalid memory area as shown in FIG. 6B, so that the Java program 104 does not run properly.

In such a case, exception handling for discontinuing processing of the Java program 104 may be performed, in response to an error that occurs unexpectedly in the program. However, in order to continue the Java program 104 normally, before the release of the external heap memory 111 subject to release, the data 602-1 is moved to the Java heap memory 110 not subject to release and the reference relationship between data is changed, thus making it possible to continue normal execution of the Java program 104 even after the release of the external heap memory 111.

Figure 7:
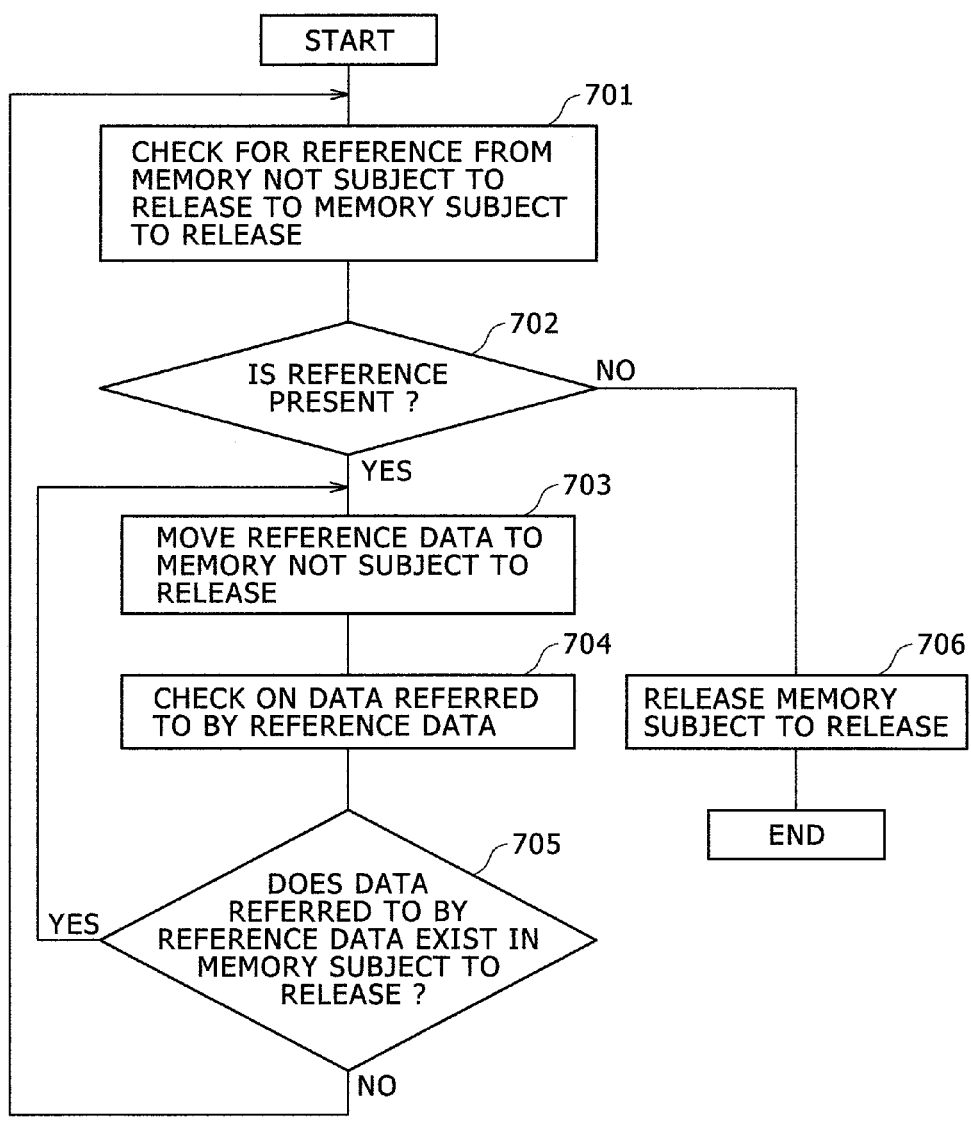
FIG. 7 is a flowchart showing release processing of an external heap memory.

FIG. 7 shows processing by the external heap releasing unit 109 including processing for ensuring the normal execution of the Java program 104. In step 701, it is checked whether or not there is a reference from data in a memory area not subject to release to data in a memory area subject to release. In step 702, it is determined whether or not there is a reference. If there is a reference, in step 703 the reference data is moved to a memory not subject to release. At this time, a reference to the moved data from another data is changed from an area before movement to an area after movement. In step 704, data that the data moved in step 703 refers to is checked. In step 705, it is determined whether the data that the moved data refers to is present in the memory subject to release. If the reference data is present in the memory subject to release, the flow returns to step 703 to process the reference data. In step 705, if the moved data refers to data in a memory not subject to release, the flow returns to step 701 to continue checking for a reference to data in the memory area subject to release.

If there is no reference to the memory subject to release after the processing of step 701 is performed on data in all memory areas not subject to release, the flow proceeds from step 702 to step 706 to release the memory subject to release. The memory area subject to release may be plural memory areas. In this case, after the execution of steps 701 to 705, plural areas are released at a time in step 706. A reference relationship to be checked in step 701 from data in a memory area not subject to release to data in a memory area subject to release may possibly be a reference relationship from data in a location called a GC root to detect in GC data necessary to execute the program. Accordingly, by moving data that can be referred to in the reference relationship to a memory area not subject to release, it is ensured that at least data determined in GC to be necessary for execution is moved, so that the execution of the program can be safely continued after the release of the memory subject to release.

Figure 8A:
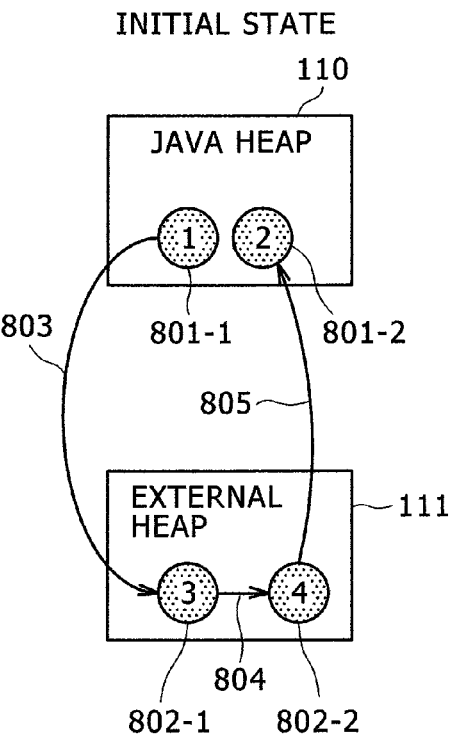
FIGS. 8A to 8C are illustrations showing an example in which an external heap memory is released.
Figure 8B:
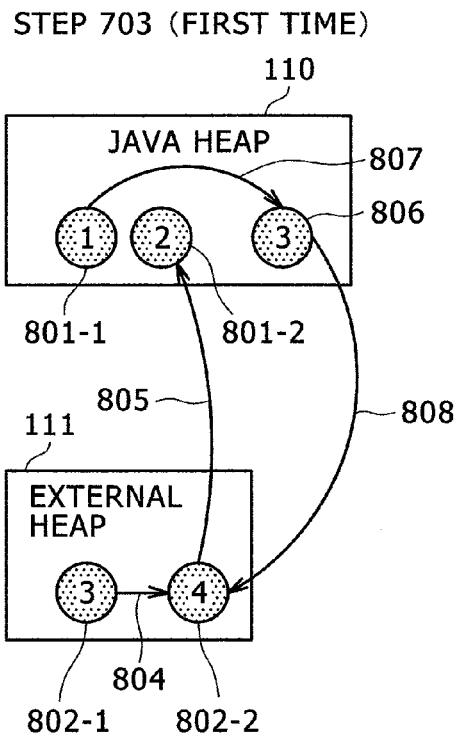

The release processing shown in FIG. 7 is applied to memories in FIG. 8A. First, a reference 803 from data 801-1 in the Java heap memory 110 not subject to release to data 802-1 in the external heap memory 111 subject to release is found. Accordingly, in step 703, the data 802-1 is moved to the memory 110 not subject to release and makes data 806, and the reference 803 from the data 801-1 is changed to a reference 807. When the data 802-1 makes the data 806, a reference 808 is generated. FIG. 8B shows data placement in the memories after the execution of step 703.

Figure 8C:
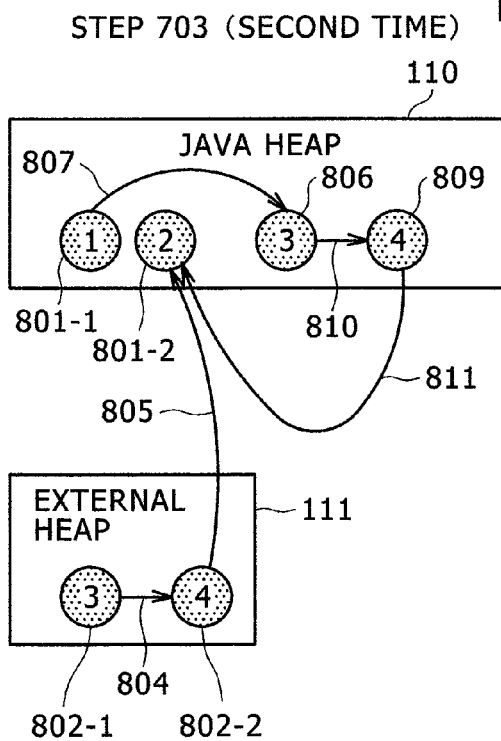
Figure 11A:
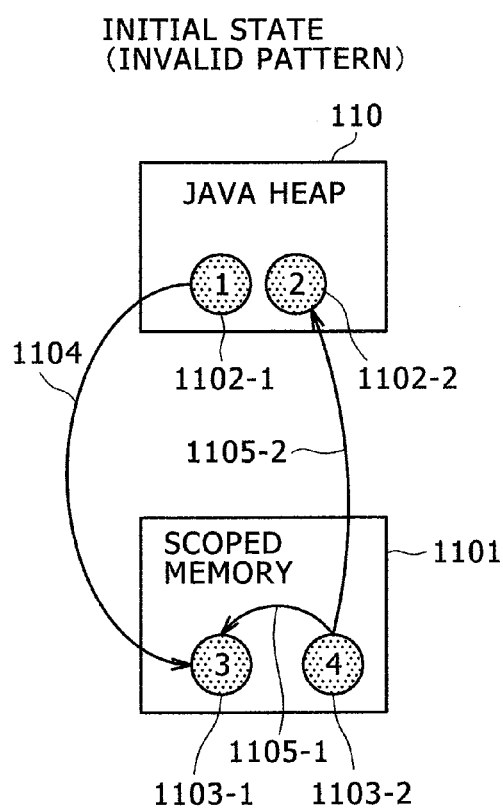
FIGS. 11A and 11B are illustrations showing an example in which data is created in a scoped memory.
Figure 11B:
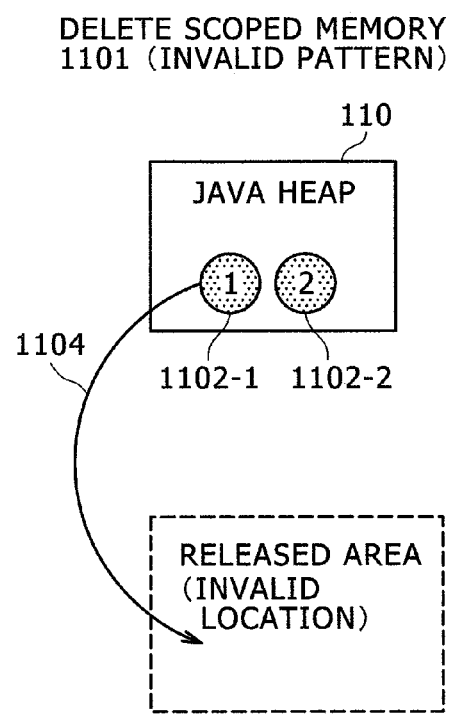

In step 704, data that is referred to by the data 802-1 moved in step 703 is checked. Through a reference 804, the existence of data 802-2 is found. In step 705, since the data 802-2 is located in the memory 111 subject to release, the flow returns to step 703 to process the data 802-2 as reference data. FIG. 8C shows data placement in the memories after the second execution of step 703. The data 802-2 is moved to the memory 110 and makes data 809, and the reference 808 from the data 806 to the data 802-2 in FIG. 8B is changed to a reference 810. Further, a reference 805 from the data 802-2 to the data 801-2 in FIG. 8B is changed to a reference 811 because the data 802-2 is moved to make the data 809.

In the state of FIG. 8C, steps 704 and 705 are executed again. Since the data 801-2 which the data 802-2 refers to is in the memory 110 not subject to release, the process returns to step 701. Since a reference to the memory subject to release cannot be found in the second execution of step 701, the process proceeds from step 702 to step 706 to release the external heap memory 111. In FIG. 8C, there exists no reference to the external heap memory 111; therefore, even though the memory area 111 is released, there arises no problem in executing the program. As for the reference 805 from the data 802-2 to the data 801-2, since the referrer data 802-2 is not referred to from data in the memory not subject to release, the presence thereof does not affect the subsequent execution of the Java program.

In the release processing of a memory area explicitly allocated by the program, if there is data necessary for execution in a memory subject to release, exception handling can be performed instead of moving the data necessary for execution. In this case, exception handling can be performed always when data necessary for execution is found, or an operation at the time of execution of a "reclaim" method for specifying area release can be specified as shown by a "setReclamationAction" method in sentence 901 in FIG. 9. Sentence 901 is an instruction to raise an exception if data necessary for execution exists in an area to be released. Further, "MOVE_TO_JAVA_HEAP" for moving data necessary for execution to the Java heap memory as well as "EXCEPTION" for raising an exception can be described as an argument of the "setReclamationAction" method.

FIG. 10 shows area release processing in which the "setReclamationAction" method can be used. In step 701, it is checked whether or not there is a reference from data in a memory area not subject to release to data in a memory area subject to release. If there is a reference, the flow moves to step 1001 from step 702. In step 1001, processing set in the "setReclamationAction" method is checked. If "EXCEPTION" is specified, an exception is raised in step 1002. If "EXCEPTION" is not specified, that is, an instruction to move necessary data to the Java heap memory 110 is specified, the flow moves to step 703 in FIG. 7. If there is no reference, the memory subject to release is released in step 706.

By the above processing, the external heap memory 111 can be created, used, and released safely without limitation on descriptions in the Java program.

What is claimed is:

1. A memory management method comprising the steps of:
   allocating a second memory area in a computer by a program having at least one thread including object data which is executed by a processor in the computer;
   storing the object data in a first memory area in accordance with execution of the at least one thread;
   moving the object data stored in the first memory area to the second memory area;
   checking whether or not the object data that is necessary for subsequent execution of the at least one thread exists in the second memory area to be released, in response to an instruction by the program to release the second memory area;
   releasing the second memory area if the object data that is necessary for subsequent execution of the at least one thread does not exist in the second memory area as a result of the check; and
   moving the object data that is necessary for subsequent execution of the at least one thread to a memory area different from the second memory area to be released if the object data that is necessary for subsequent execution of the at least one thread exists in the second memory area to be released as a result of the check, and releasing the second memory area.

2. A memory management method according to claim 1, further comprising the step of:
   moving the object data stored in the first memory area to the second memory area, upon occurrence of garbage collection in the first memory area.

3. The memory management method according to claim 1, wherein the memory area different from the second memory area is subject to garbage collection.

4. A memory management method according to claim 1, wherein the memory area different from the second memory area includes the first memory area.

5. The memory management method according to claim 1, wherein the object data necessary for subsequent execution of the at least one thread is referred to from data outside the memory area to be released.

6. The memory management method according to claim 1, further comprising the step of:
   moving the object data that is referred to by the moved data to the different memory area if the data that is referred to by the moved data exists in the memory area to be released.

7. The memory management method according to claim 1, wherein at least one of the first memory area, the second memory and the memory area different from the second memory area is allocated in a non-volatile memory device.

8. A computer comprising:
   a processor;
   a second memory area allocated by a program having at least one thread including object data which is executed by said processor, a first memory area storing said object data in association with execution of the at least one thread and said second memory area being released,
   wherein said processor moves the object data stored in the first memory area to the second memory area;
   wherein said processor checks whether object data necessary for subsequent execution of the at least one thread exists in the second memory area to be released, in response to an instruction to release the second memory area,
   wherein said processor releases the second memory area if the object data necessary for subsequent execution of the at least one thread does not exist in the second memory area, and
   wherein said processor moves the object data that is necessary for subsequent execution of the at least one thread to a memory area different from the second memory area to be released if the object data that is necessary for subsequent execution of the at least one thread exists in the second memory area to be released as a result of the check, and releases the second memory area.

9. The computer according to claim 8, wherein the processor executes an operation specified by the program if the object data that is necessary for subsequent execution of the program exists in the second memory area as a result of the check.

10. The computer according to claim 9, wherein the processor executes exception handling as the operation specified by the program.

11. The computer according to claim 8, wherein the processor moves the object data that is necessary for subsequent execution of the at least one thread to the different memory area that is subject to garbage collection.

12. The computer according to claim 8, wherein the processor determines that the object data that is necessary for subsequent execution of the at least one thread is first object data that is referred to from second object data outside the second memory area to be released.

13. The computer according to claim 8, wherein the processor determines that the object data that is moved is first object data and second object data that is referred to by the moved first object data is moved to the different memory area if the second object data that is referred to by the moved first object data exists in the second memory area.

14. The computer according to claim 8, wherein said processor moves the object data that is necessary for subsequent execution of the at least one thread to a memory area different from the second memory area to be released, in response to an instruction by the program.

15. A non-transitory computer-readable medium containing executable computer program code which, when executed by a computer, causes the computer to perform a memory management method comprising the steps of:
    allocating a second memory area in a computer by a program having at least one thread including object data which is executed by a processor in the computer;
    storing the object data in a first memory area in accordance with execution of the at least one thread;
    moving the object data stored in the first memory area to the second memory area;
    checking whether or not the object data that is necessary for subsequent execution of the at least one thread exists in the second memory area to be released, in response to an instruction by the program to release the second memory area;
    releasing the second memory area if the object data that is necessary for subsequent execution of the at least one thread does not exist in the second memory area as a result of the check; and
    moving the object data that is necessary for subsequent execution of the at least one thread to a memory area different from the second memory area to be released if the object data that is necessary for subsequent execution of the at least one thread exists in the second memory area to be released as a result of the check, and releasing the second memory area.

16. The non-transitory computer-readable medium containing executable computer program code according to claim 15, which, when executed by a computer, causes the computer to perform a memory management method further comprising the step of: executing an operation specified by the program if data necessary for subsequent execution of the of the at least one thread exists in the second memory area as a result of the check.

17. The non-transitory computer-readable medium containing executable computer program code according to claim 16, which, when executed by a computer, causes the computer to perform a memory management method, wherein the specified operation is exception handling.

18. The non-transitory computer-readable medium containing executable computer program code according to claim 16, which, when executed by a computer, causes the computer to perform a memory management method that moves the object data that is necessary for subsequent execution of the at least one thread to the different memory area that is subject to garbage collection.

19. The non-transitory computer-readable medium containing executable computer program code according to claim 15, which, when executed by a computer, causes the computer to perform a memory management method wherein the processor determines that the object data that is necessary for subsequent execution of the at least one thread is first object data that is referred to from second object data outside the second memory area to be released.

20. The non-transitory computer-readable medium containing executable computer program code according to claim 15, which, when executed by a computer, causes the computer to perform a memory management method determining that the object data that is moved is first object data and second object data that is referred to by the moved first object data is moved to the different memory area if the second object data that is referred to by the moved first object data exists in the second memory area.

21. The non-transitory computer-readable medium containing executable computer program code according to claim 15, which, when executed by a computer, causes the computer to perform a memory management method, further comprising the step of:
    moving the data to a memory area different from the second memory area to be released, in response to an instruction by the program.

* * * * *